United States Patent [19]

Sawyer et al.

[11] Patent Number: 5,247,698
[45] Date of Patent: Sep. 21, 1993

[54] USE OF AN AUDIT MESSAGE SENT TO MOBILE STATIONS TO CONFIRM THE LOCATION THEREOF

[75] Inventors: Francois Sawyer, St. Hubert; Janice Wong, Longueuil, both of Canada

[73] Assignee: Telefonaktiebolaget LM Ericsson, Stockholm, Sweden

[21] Appl. No.: 485,130

[22] Filed: Feb. 26, 1990

[51] Int. Cl.⁵ ............................................. H04Q 7/00
[52] U.S. Cl. ................................. 455/33.1; 455/34.1; 455/56.1; 379/59
[58] Field of Search .................... 455/33, 34, 54, 56, 455/67-68; 379/59, 60, 63; 340/992, 993

[56] References Cited

U.S. PATENT DOCUMENTS

| | | | |
|---|---|---|---|
| 4,178,476 | 12/1979 | Frost | 379/59 |
| 4,700,374 | 10/1987 | Bini | 379/60 |
| 4,723,266 | 2/1988 | Perry | 379/60 |
| 4,737,978 | 4/1988 | Burke et al. | 379/60 |
| 4,775,999 | 10/1988 | Williams | 379/59 |
| 4,833,701 | 5/1989 | Comroe et al. | 379/60 |
| 4,833,702 | 5/1989 | Shitara et al. | 379/60 |
| 4,843,622 | 6/1989 | Yotsutani et al. | 379/63 |
| 5,054,110 | 10/1991 | Comroe et al. | 379/59 |

Primary Examiner—Reinhard J. Eisenzopf
Assistant Examiner—Andrew Faile
Attorney, Agent, or Firm—Johnson & Gibbs

[57] ABSTRACT

A mobile communications system includes at least one subscriber; a home exchange for the at least one subscriber; at least two exchanges, which may include the home exchange, that may be accessed by the at least one subscriber; and means for ensuring that the at least one subscriber has registered as being located within only one of the at least two exchanges. A method according to the teachings of the present invention includes the steps of cancelling all but the last registration when more than one registration is effected and correctly reestablishing mobile station registration and location data by sending an audit message from the exchanges in which a registration was cancelled to a mobile when the registration was cancelled within a predetermined period of time after being established.

13 Claims, 2 Drawing Sheets

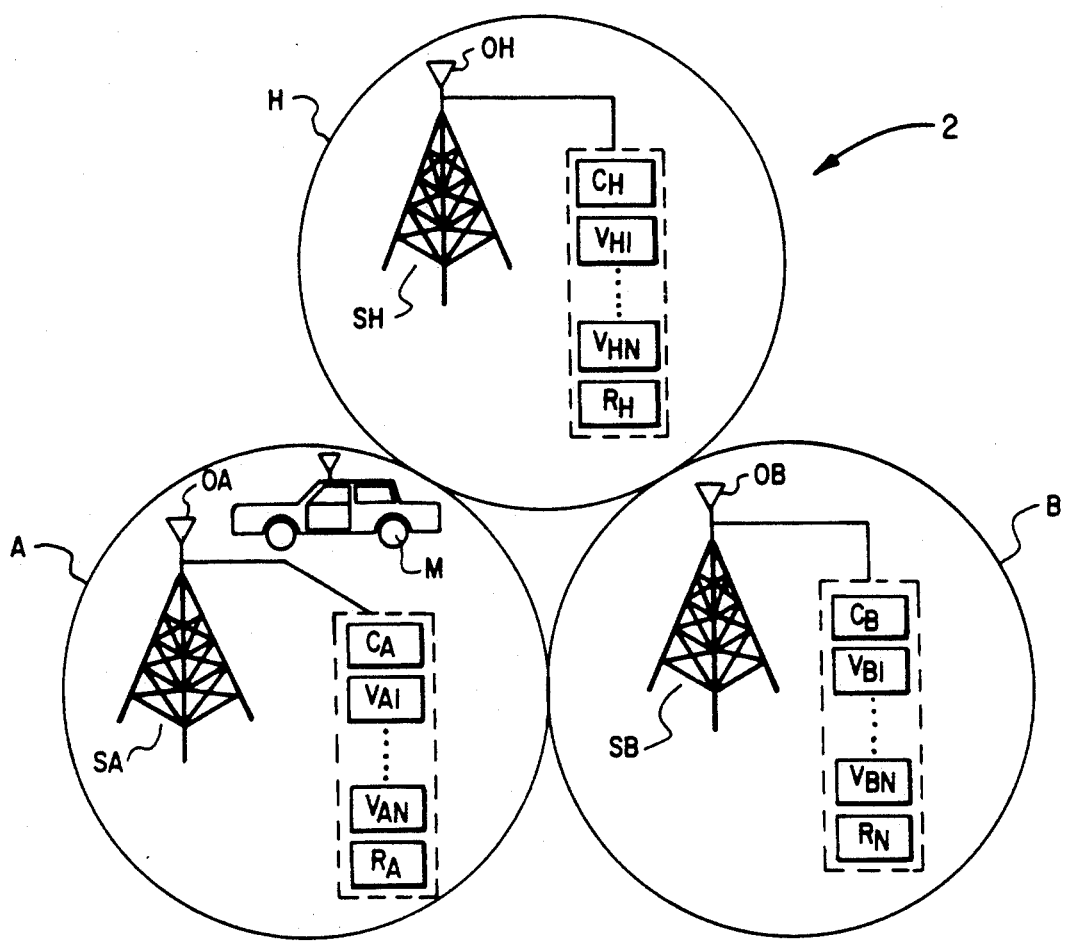
FIG. 1
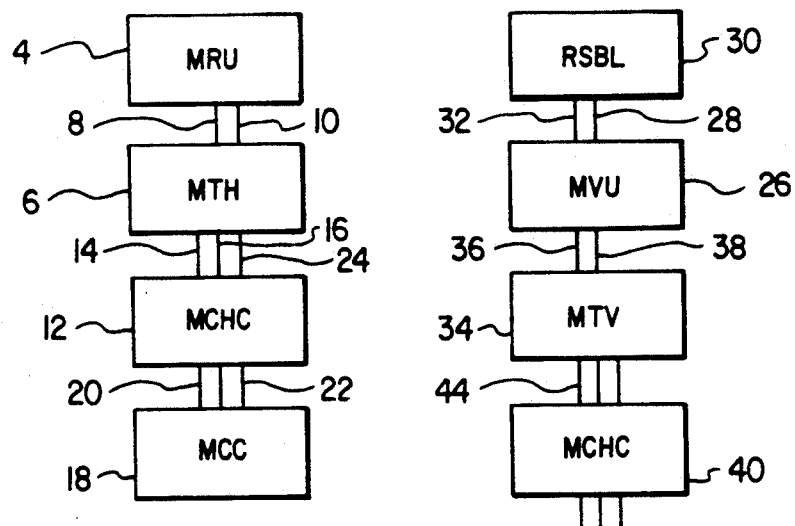
FIG. 2        FIG. 3

USE OF AN AUDIT MESSAGE SENT TO MOBILE STATIONS TO CONFIRM THE LOCATION THEREOF

BACKGROUND OF THE INVENTION

1. Field of the Invention

The present invention relates to mobile radio communication systems which have fixed radio-based stations and mobile stations between which control signals are transmitted. In particular, the present invention relates to a control signal transmission system in which registration access signals are sent from the mobile stations to the fixed stations and in which paging signals are sent from the fixed stations to the mobile stations.

2. Description of Related Art

Radio telephone service, which has been in use for some time, has traditionally comprised a central site capable of transmitting to a limited number of mobile or portable telephones in a large geographic area via high-powered transmitters. For clarity and convenience, the terms "mobile station" and "mobile stations" will henceforth be used in this document to mean mobile or portable radio telephone stations. Because mobile station transmissions originated in generally low power transmitters, in prior art systems mobile station transmissions were generally received by a network of satellite receivers remotely located from the central site. The satellite receivers were operable to receive and relay mobile station transmissions to the central site for processing. In prior art systems only a limited number of radio channels were available, thus limiting the number of radio telephone conversations in an entire city to the specific number of available channels.

Modern cellular radio telephone systems have a comparatively large number of radio channels available. These channels can be effectively increased by reuse of the radio channels in a metropolitan area, such as the metropolitan area of a large city like Chicago or New York, by dividing the radio coverage area into smaller coverage areas called cells and by using low power transmitters and coverage restricted receivers. Cellular systems of this general type are further described in U.S. Pat. Nos. 3,906,166 and 4,268,722. The limited coverage area within a cell enables the radio channels used in one cell to be reused in another cell which is geographically separated from it according to a predetermined plan, such as the exemplary four-cell pattern shown and described in U.S. Pat. No. 4,128,740. In this four-cell pattern, each cell is assigned a subset of the available radio channels and reuse of the radio channels is accomplished by repeating the pattern throughout a metropolitan area.

A cellular system typically utilizes a pair of radio frequencies for each radio channel in each cell. Each cell is assigned at least one paging/access channel and several voice channels. The paging/access channel is employed to control the operation of the mobile stations by means of data messages transmitted to and received from the mobile station. Control functions performable include identifying the particular cellular system to the mobile stations, instructing mobile stations to tune to a voice channel where a conversation may take place, receiving requests for service from mobile stations, and enabling mobile registration. The latter function refers to the process by which the mobile stations identify themselves to the system. The data message and radio channel specifications for U.S. cellular radio telephone systems are set forth in Electronic Industries Association (EIA) Standard IS-3D implemented in accordance with 47 C.F.R. 22 and Federal Communications Reports and Orders. Copies of EIA Standard IS-3D may be obtained from the Engineering Department of the Electronic Industries Association at 2001 Eye Street, N.W., Washington, D.C. 20006.

Since each cell of a cellular system may be relatively small in size, the likelihood of a mobile station travelling out of one cell and into another cell is high. The process of switching the established call from one cell to another is known as a handoff. A cellular system may determine the need for a handoff by periodically measuring the signal strength of each active mobile station. If the measured signal strength is below a predetermined level, the cellular system can determine the availability of other channels in neighboring cells and transmits an instruction to the mobile station commanding it to tune to an available channel in any one such acceptable cell. Also, as the number of cellular systems increase, handoffs between different cellular systems may take place in order to maintain a call as a mobile station passes from the coverage area of one cellular system to another.

It should be recognized that a purpose of mobile registration is to permit calls to a mobile station to be automatically delivered even though the mobile station may be moving from place to place through a network of cellular systems. It should also be recognized that mobile station registration according to EIA Standard IS-3D is effected by means of an interaction between the cellular system and the mobile stations operating in its service area. This interaction is called "autonomous registration" and it is controlled by the cellular system through certain information transmitted to the mobile stations. This information is in the form of an overhead message train (OMT), which is transmitted on paging/access channels throughout a cellular system service area, normally once each second. The OMT includes a system parameter overhead message including station and registration related messages, and optionally, several other messages of which the registration identification message and the registration increment message are relevant to the autonomous registration process.

Registration may be enabled or disabled individually for each class of mobile station, e.g., home or roam (explained below), by means of control bits in the system parameter overhead message. The system parameter overhead message also contains the identification number of the serving cellular system from which the mobile station determines whether it is a "home" or a "roam" mobile station. Each mobile station contains, in its internal memory, an entry indicating the identity of its home cellular system and entries indicating a predetermined number, e.g., four, of cellular systems (which may include the home cellular system) in which it has most recently registered successfully, along with a value for each cellular system used to determine when it is scheduled to re-register in that cellular system.

In the mobile telephone systems used in North America, the United Kingdom and in other markets, twenty-one frequencies are allocated for the control channels. A two-bit digital color code (DCC) is used to differentiate control channels using the same frequency. It is thus possible to have up to 84 cells, each cell having a control channel with a unique set of frequency and DCC combinations.

In densely populated areas, subscriber demand may require more than 84 cells to provide adequate mobile telephone service. In these systems, identical control channels may exist within the coverage area of a single exchange or within the coverage area of several neighboring exchanges.

A registration access signal is sent over the control channel by the mobile station and it is used to localize the subscriber in the mobile telephone exchange network. This signal enables a visited exchange to update the roaming subscriber's home exchange with the new location of the mobile station. However, this signal may be overheard by other control channels that have identical parameters, resulting in one or more cooperating exchanges registering the subscriber as a visitor. This occurrence is known as a multiple access (usually with double access occurring) and may result in incorrect location data updating within the home exchange for the roaming subscriber.

Such incorrect data within a system inefficiently uses system assets and can lead to such problems as failure of calls terminating at a mobile station. Thus, the unsatisfactorily addressed existence of multiple access is a shortcoming and deficiency of heretofore designed and implemented mobile communications systems.

Although no prior art solutions to the aforementioned multiple access problem are known, a number of patents contain teachings that bear some relation to the matters discussed herein. These patents are U.S. Pat. Nos. 4,833,702, 4,178,476, 4,352,955, and 4,843,622. Each of these patents is discussed briefly immediately below.

U.S. Pat. No. 4,833,702 to Shitara et al. discloses a mobile telephone system having a central controller and a cordless telephone located in a local service area. The central controller transmits a periodic pre-registration polling signal to all cordless telephones which can receive it and registers telephones from which a response signal is returned. After a cordless telephone is registered, a post-registration signal is transmitted by the telephone at periodic intervals. The central controller cancels the telephone registration if the post-registration signal is not detected for a prescribed time period.

U.S. Pat. No. 4,178,476 to Frost relates to an automatic roaming paging system of the type wherein multiple subscribers are each provided with a subscriber receiver which responds to a uniquely coded radio transmission by providing a perceptible indication that the subscriber is being paged, and in which each subscriber is assigned to a home station which broadcasts each radio transmission through a prescribed geographical area served by that station. Specifically, Frost teaches a method including the steps of responding to a predetermined command originating from at least one of the subscribers by automatically transferring page data subsequently received at a home station of the one subscriber to a further station which serves a further geographic area for the one subscriber and for which page data is received at the further station; transmitting from the further station the uniquely coded radio transmission to which the receiver of the one subscriber responds; and automatically suspending transmission of the uniquely coded radio transmissions intended for a subscriber by the home station of the subscriber in response to receiving a suspend command from that subscriber.

U.S. Pat. No. 4,352,955 to Kai et al. relates to a control signal transmission system for use in a mobile radio communication system. According to the teachings of Kai et al., a control signal transmission system for mobile radio communications uses a plurality of control channels extending between a plurality of mobile units and at least one control center. The control center transmits systems information signals and paging signals during individually associated time frames. The mobile units transmit response signals corresponding to the paging signals by transmitting to the control signals through the control channels. At least one frame of the system provides for a transmission of responsive information signals, following each frame including the paging signals. Each of these response signals includes an identification number of the replying mobile unit.

U.S. Pat. No. 4,843,622 to Yotsutani et al. relates to a communication control system including a searching arrangement. Yotsutani et al.'s system uses a page sent on a control channel to locate a mobile subscriber. This system controls several cells. This system sends a page to a plurality of cells in a given area when it has a call to place. Upon receiving a response from a mobile in a given cell, addressing is begun to the mobile in that cell.

Review of each of the foregoing patents reveals no disclosure or suggestion of a solution such as that taught herein to the multiple access problem.

SUMMARY OF THE INVENTION

The present invention overcomes the shortcomings and deficiencies of the prior art indicated above by providing a mobile telephone system including at least one subscriber, a home exchange for the at least one subscriber, at least two exchanges, possibly including the home exchange, that may be occupied by the at least one subscriber and means for ensuring that the at least one subscriber is registered as being located in only one of the at least two exchanges.

According to the teachings of the present invention, the latter means, that is, the means for ensuring the at least one subscriber is registered as being located in only one of the at least two exchanges may include means included with the at least one subscriber for registering as being located in an exchange, and means for correcting data within the home exchange if the at least one subscriber is erroneously indicated to be located in more than one exchange.

Further, according to the teachings of the present invention, the means for correcting data within the home exchange if the at least one subscriber is erroneously indicated to be located in more than one exchange may include means for cancelling all but the last registration when the at least one subscriber is registered as being located in more than one exchange, and means for registration to be re-established by any one of the at least two exchanges if appropriate.

Still further according to the teachings of the present invention, the means for a registration to be re-established by one of the at least two exchanges if appropriate may include an audit message sent by the exchanges to a mobile whose registration was cancelled within a predetermined period of time after registration was established. This predetermined period of time may be brief and, further, this audit message may be a page request.

According to the teachings of the method of the present invention, a method of ensuring a mobile subscriber having a home station is registered to only one exchange as being located therein includes the steps of cancelling all but the last registration when more than one registration is affected, and correctly re-establishing mobile station registration.

In embodiments of the method of the present invention, the step of correctly re-establishing mobile station registration may comprise the step of sending an audit message from the exchanges in which a registration was cancelled to the mobile when the registration was cancelled within a predetermined period of time after being established and also the step of using an audit response from the mobile station or a lack thereof to confirm the mobile station registration cancellation, respectively. In the method of the present invention the audit message may be a page request and the predetermined period of time may be brief.

An object of the present invention is to ensure correct location data is developed and maintained with mobile telephone systems.

Another object of the present invention is to correct obviously erroneous data within mobile telephone systems, e.g., data indicating that a mobile is simultaneously located within two separate exchanges.

BRIEF DESCRIPTION OF THE DRAWINGS

Other objects, advantages and novel features of the present invention will become apparent from the following detailed description of the invention when considered in conjunction with the accompanying drawings wherein:

FIG. 1 is a schematic diagram of a simplified three-cell radiotelephone communications system;

FIG. 2 is a block diagram of mobile telephone home exchange blocks affected by the auditing function of the present invention;

FIG. 3 is a block diagram of mobile telephone visited exchange blocks affected by the auditing function of the present invention;

DETAILED DESCRIPTION OF THE INVENTION

Figure 4:
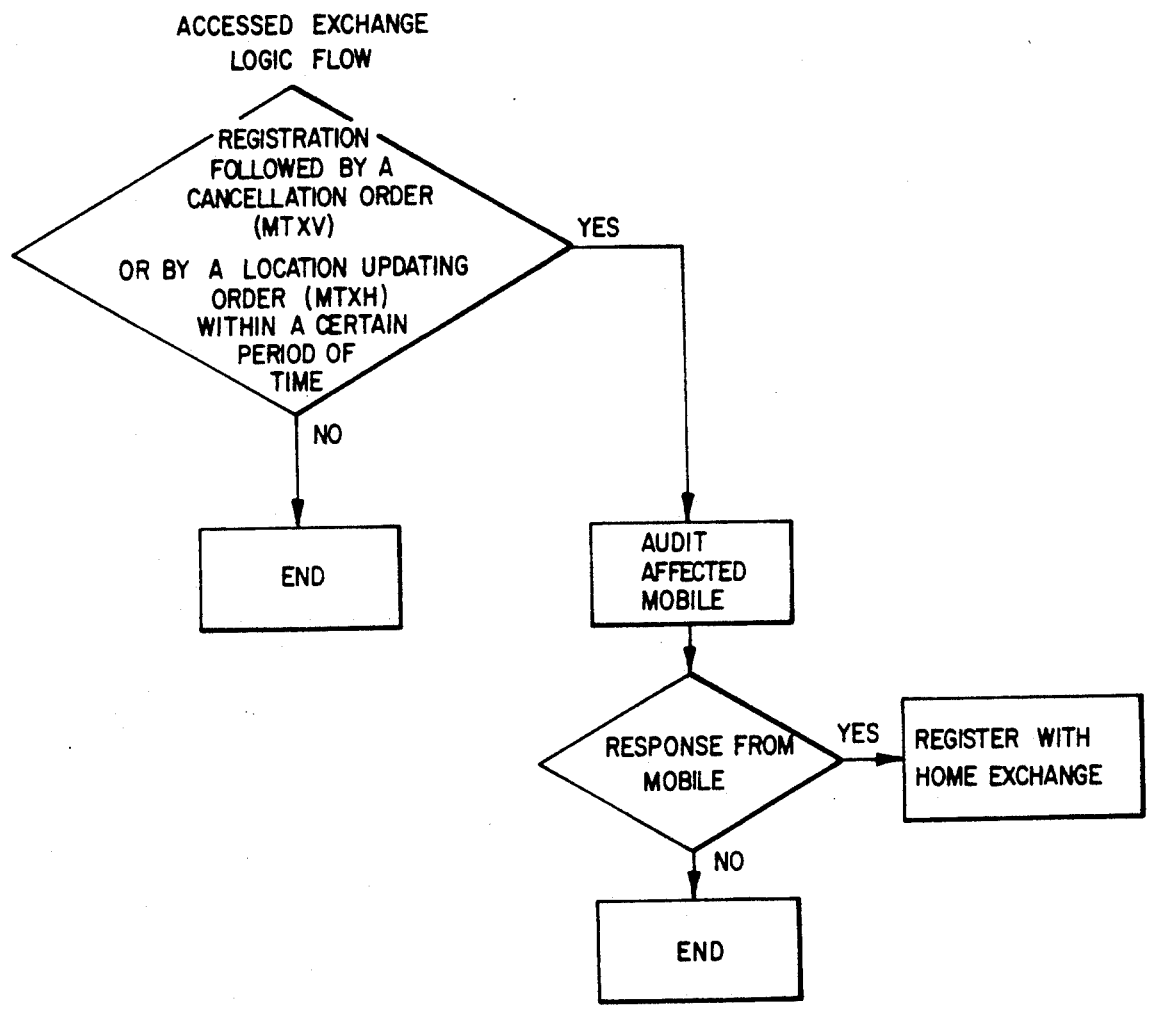
FIG. 4 is a flowchart of exemplary auditing steps performed by an accessed exchange according to the teachings of the present invention to ensure that proper location of mobiles is determined.

FIG. 1 shows three geographically separated cells out of many in a cellular radiotelephone communications network including three exchanges. Network 2 includes cells H, A and B served by fixed stations SH, SA and SB, respectively. Using terms that will be clearly understood based upon further discussions below, cell H is one cell of a "home" exchange and cells A and B are one cell of each of two "visited" exchanges. Fixed stations SH, SA and SB (which are typically located near the geographical center of their respective cells, each include a control channel RF transceiver C, at least one (and typically several) voice channel RF transceivers V, a locating RF receiver R, and an antenna O.

The voice channel transceivers are used to communicate voice signals (e.g., conversations) with mobile transceivers M. The voice channel transceivers V of a fixed station S operate on different radio frequencies (or pairs of frequencies for duplex operation) so that all of those voice channels can be used simultaneously without interfering with one another.

The maximum number of mobile transceivers a fixed station can provide service to is thus equal to the number of voice channel transceivers the fixed station is provided with. For example, fixed station $S_A$ is equipped with N voice transceivers ($V_{A1}$-$V_{AN}$), and may therefore simultaneously serve N mobile transceivers M within cell A.

Control channel transceivers C are used to exchange control information with mobile transceivers M. A mobile transceiver M typically requires control information only occasionally (e.g., to initially establish communications between the mobile transceiver and a voice channel transceiver V). Therefore, a single control channel transceiver C is usually sufficient to handle control signal traffic for all mobile transceivers within a cell. For example, during call set-up, cell A control transceiver $C_A$ receives control information from and transmits control information to mobile transceivers M operating within cell A.

Locating receivers R provide signal strength measurements (sometimes called "Received Signal Strength Indicators" or RSSIs) of signals transmitted by mobile transceivers M. Such RSSI measurements are used by cellular system 2 to determine which fixed station S (i.e., which cell) can best serve particular mobile transceivers M. Each locating receiver R is tunable to any voice channel used in system 2 (and is thus operable on frequencies other than those used by voice channel transceivers V associated with the same cell as is the locating receiver). Locating receivers R perform measurements on demand, and therefore, each fixed station S generally requires only a single locating receiver R to perform all RSSI measurements for that cell. For example, locating receiver $R_A$ performs all RSSI measurements for cell A.

As mentioned in the description of related art section above, various registration procedures have been devised to maximize processing capability and to enhance efficiency of cellular radiotelephone communications systems. These procedures are set forth in detail in EIA Standard 1S-3D. Generally, the procedures are designed so that a mobile registers often enough so that it does not become "lost" in the system, but not so often that the cellular system becomes burdened with unnecessary registration messages that need to be processed.

It will be recalled from the discussion in the description of related art section above that each mobile has a "home" mobile telephone exchange H although it may "roam" in or "visit" the cells of other mobile telephone exchanges such as A and B in FIG. 1. Data regarding a mobile's location is maintained in that mobile's home station or exchange, the updating of that data being effected by "visited" exchanges that detect a mobile located therein.

The problem solved by the present invention relates to the simultaneous registration of a mobile in more than one exchange, all but one of the registrations being erroneous. This problem arises because of the 84 different cell limit that exists because of limited frequency allocations. A registration access signal sent over a control channel by a mobile in a densely populated area may be overheard by more than one control channel having identical identification data. Thus, one or more cooperating exchanges can register the subscriber as being located there. This so-called "multiple accessing" results in incorrect location data updated within the home exchange for the roaming subscriber.

According to the teachings of the present invention, the aforementioned problem is solved by forcing a system to allow a subscriber to be registered to only one exchange. When a multiple access occurs, according to the present invention, the home exchange cancels all but the last registration access. Further according to the teachings of the present invention, the registration and forced cancellation of a registration triggers an audit within all but one of the effected exchanges. This audit solicits a response from a mobile and any exchange that receives a response will re-establish the registration. If no exchange receives a response, no registration will be re-established and, by default, the last exchange to register the mobile will retain the registration. Based upon the receipt of the response, registration in the proper exchange may again be effected and the mobile's home exchange advised of the mobile's correct location. One aspect of the present invention is the use of a page request for an audit message.

Further details regarding the present invention may be best understood with reference to FIGS. 2 and 3. The audit sequence according to the present invention could be implemented in all exchanges so that the general sequence is initiated when registration accesses are immediately followed by cancellation messages received in a mobile telephone visited exchange or by location updating messages received in a mobile telephone home exchange.

The audit message, e.g., a page request, is sent to the appropriate mobile station. Such mobile station is paged in the area in which it just registered. The page request is seen by the mobile station as any other page.

When an audit response is received, a serial number check is performed as is usually done upon a page response and a release order is sent to the mobile station.

The blocks (that is, functional units or modules, comprising software and/or hardware designed to perform specific functions) within an exchange affected by the auditing function include MVU, MTV, MTH, MCHC and MCC. The acronyms MTV and MTH designate a Mobile Telephone Visiting Subscriber with Automatic Roaming capability and a Mobile Telephone Home Subscriber with Automatic Roaming capability, respectively. The acronym MVU designates a block in a visited exchange of a mobile system which receives a cancellation message from a home exchange, acknowledges that cancellation message, orders disconnection upon receiving such a cancellation message, receives acknowledgement of disconnection (real or otherwise), and sends location updating messages to the home exchange as appropriate. The MVU block has a counterpart in the home exchange designated the MRU block. The acronyms MCHC and MCC designate those blocks in a mobile telephone exchange that order and perform, respectively, auditing of mobile subscribers. For clarity and convenience, other acronyms used in the ensuing discussion are defined as follows:

MTS—Mobile Telephone System
MTXH—Mobile Telephone Exchange-Home
MTXV—Mobile Telephone Exchange Visited
MLCM—Cancellation Message
MRNUM—Mobile Telephone Roamer Routing Number
MLUM—Mobile Telephone Location Updating Message
RSBL—Roaming Signalling Block Referring now to FIG. 2, the structure (i.e., the relevant blocks) involved in an audit function in a home exchange is shown therein in block diagram form. The audit function begins when an order to update the location from the home exchange to an automatic roaming cooperating exchange is sent from the MRU block 4 to the MTH block 6 via link 8. The MTH block 6 acknowledges this order via link 10. Next, if a registration from the same mobile station had been received in its home exchange just before the location update, then the MTH block 6 requests auditing via the MCHC block 12 via link 14. The response to this audit request may be an indication of congestion in the MCHC block 12, which indication of congestion is communicated back to the MTH block via link 16. If there is no congestion in the MCHC block 12, the audit order is transferred by the MCHC block 12 to the MCC block 18 via link 20. A successful audit is communicated to the MTH block 6 by the MCC block 18 via the MCHC block 12 and links 22 and 24. Such a successful audit leads to the MTH block 6 cancelling the registration in the other exchange by sending signal CANCELRMS to the block MRU 4 via link 10 and to MTH block 6 resetting location data for the mobile station so that the station is indicated to be located in the home exchange. That same chain is also used to report no response or congestion in paging.

Referring now to FIG. 3, the structure (i.e., the relevant blocks) involved in an audit function performed in a visited exchange is shown therein in block diagram form. In this case, auditing begins with receipt by the MVU block 26 of a cancellation message from the home exchange of an automatic visitor (which would be transmitted to that block 26 via link 28 connecting it to the RSBL block 30). Such receipt is acknowledged via link 32. Next, the MVU block orders disconnection for the visitor of the MTV block 34 via link 36. Real or simulated disconnection in response to this order is transmitted from the MTV block 34 to the MVU block over link 38 as appropriate. Next, if a registration from the same mobile station had been received in this visited exchange just before the cancellation message, auditing is effected by the MTV block by orders through and to the MCHC and MCC blocks, blocks 40 and 42, respectively, in a manner similar to that described above with reference to FIG. 2. A successful audit leads to registration; an unsuccessful audit leads to disconnection.

With reference to both FIGS. 2 and 3, certain details regarding signals passing between various of the blocks are worthy of special note. Accordingly, a brief discussion of these details follows.

First, with regard to the MVU block 26 in FIG. 3, this block 26 in embodiments of the present invention adds a code to a conventional signal DISCVMS that it sends to the MTV block 34, which code indicates when disconnection is actually in response to the disconnection message (MLCM).

Further with reference to FIG. 3, the MTV block includes a clock that is stepped once every second. The MTV block also includes means for storing the time of each registration access. According to the teachings of the present invention, the MTV block 34 further includes means for checking the time duration since the last registration was checked when a disconnection order due to a cancellation message is received. Still further, the block 34 includes means for performing various operations if this time duration is found to be less than a predetermined amount of time, e.g., two seconds. One such operation consists of marking the relevant mobile record so that updating of that mobile's location to its MTXH will be effected at the next mobile station access. Another such operation could consist of marking the "visiting" mobile inactive to prevent paging. Also, the block 34 could send a FINDMSPOS signal to the MCHC block 40 with a code indicating that auditing of the mobile is required. In FIG. 3, the link over which this FINDMSPOS signal and code is sent is designated by reference numeral 44. After auditing, which is explained further below, if no audit response is received from the mobile and if that mobile is still inactive at the time when the audit result is received, the block MTV 34 can operate to disconnect the visitor record. If, on the other hand, an audit response is received, a location updating message can be sent to the relevant MTXH. In embodiments of the present invention, the MTV block 34 may also be configured or programmed to treat a call or a registration access received during the auditing as a successful audit response.

Referring now to FIG. 2, the MTH block, like the MTV block, also includes a clock that is stepped once each second. Such a block also stores the time of each registration access. According to the teachings of the present invention, when a location is updated to an automatic cooperating exchange, the time duration since the last registration is checked. If this time duration is found to be equal to or less than a predetermined amount of time, e.g., two seconds, the mobile subscriber is marked inactive to prevent paging. Like block MTV 34 mentioned above, the block MTH 6 can send a FINDMSPOS signal (via link 14) to the MCHC block 12 with a code indicating that auditing of the mobile station is required. If no audit response is received, the mobile subscriber can be marked active but no further action is taken, the location having already been updated. If, on the other hand, an audit response is received, the location data in the mobile's MTHX is reset to home and a cancellation message is sent to the visited exchange. A call or registration access received during the auditing could be handled by the MTH block 6 so as to have the same effect on the roaming updating as a successful audit response.

With reference to both FIGS. 2 and 3, the MCHC blocks 12 and 40 detect in FINDMSPOS signals (sent from either the MTV block 34 or the MTH block 6) whether auditing of a mobile station is being requested. If so, an auditing signal, such as a page request signal (PAGEMS) is sent to the MCC block 18 or 42 after a predetermined delay, e.g., six seconds. The delay is used to let the mobile station return to an idle state following the registration it just made. The result of this auditing is returned to the MTV block 34 and/or the MTH block 6, as appropriate.

With further reference to both FIGS. 2 and 3, the MCC blocks 18 and 42 detect in the auditing signal, e.g., PAGEMS, that auditing of a mobile station is requested. In embodiments of the present invention, location area paging or global paging may be used. Upon audit response, a release order is sent to the mobile station. By way of example only, immediately following is a sequence diagram illustrating a solution to multiple accesses upon registrations according to the teachings of the present invention. Both audit functions in the home and visited exchange are included. This diagram should be of significant utility for those persons skilled in the relevant art.

| LABEL | FUNCTION | INTERWORK | | | | SIGNAL | DATA |
|---|---|---|---|---|---|---|---|
| | | MCC | MCHC | MTH | MRU | | |
| 1: | AUDIT FUNCTION IN THE HOME EXCHANGE | | | | | | |
| | START CONDITION: | | | | | | |
| | Order to Update the Location From Home to Automatic Roaming Cooperating Exchange Update the Location. | | | <======* | | UPLOC | D1 MTH Pointer, D2 Sending Ref, D3 Sending Ind, D6 Exchange Ptr |
| | Acknowledgement. | | | *======> | | UPLOCR | D1 Receiv. Ind, D2 Result Code. |
| | If < Mobile Station Has Not Registered at Home During the Previous 2 seconds > Then End. ENDIF. Mark Subscriber Inactive (to Prevent Paging During Audit). | | | | | | |
| | Audit the Mobile Station | | <======* | | | FINDMSPOS | D1 MTH Pointer, D2 MTH Ref, D3 Number of Digits, D4 Digits 0-3, D5 Digits 4-7, D6 Digits 8-11, D7 SRNB INDIC, D8 SRNB LSB, D9 SRNB MSB, D10 Audit Code. |
| | If < Congestion in MCHC > Then Inform the Subscriber Block Mark Subscriber Active. End. ENDIF. Wait for 6 Seconds (to let the Mobile Station | | *======> | | | MSPOSNOFOUND2 | D1 MTH Indiv. |

-continued

| | | | |
|---|---|---|---|
| Rescan and Become Stable on a Control Channel). Transfer the Audit Order. | <======* | PAGEMS | D1 MCHC Indiv,<br>D2 MCHC Ref,<br>D3 Number of Digits,<br>D4 Digits 0-3,<br>D5 Digits 4-7,<br>D6 Digits 8-11<br>D7 SRNB INDIC,<br>D8 SRNB LSB,<br>D9 SRNB MSB,<br>D10 Audit Code |
| CASE < Response ><br>    < Successful<br>    Audit ><br>    Inform the<br>    Subscriber<br>    Block<br>    Release the<br>    MCHC Individual | *======><br>*======> | MSPAGERESP<br>MSPOSFOUND2 | D1 MCHC Indiv.<br>D1 MTH Indiv. |
| If < Location is<br>    Automatic<br>    Roaming ><br>Then<br>    Send Cancel-<br>    lation to the<br>    Visited Ex-<br>    change | *======> | CANCELRMS | D1 Number of Digits,<br>D2 Digits 0-3,<br>D3 Digits 4-7,<br>D4 Digits 8-11<br>D5 Location. |
| ENDIF.<br>Set Location to Home.<br>Mark Subscriber Active.<br>Start Activity Supervision<br>End.<br>< No Audit Response ><br>Inform the Sub-<br>scriber Block<br>Release the MCHC Individual.<br>Mark Subscriber Active.<br>End. | *======><br>*======> | NOPAGERESP<br>MSPOSNOFOUND2 | D1 MCHC Indiv.<br>D1 MTH Indiv. |
| < Congestion in Paging><br>Inform the Sub-<br>scriber Block<br>Release the MCHC Individual.<br>Mark Subscriber Active.<br>End.<br>ENDCASE. | *======><br>*======> | PAGECONG<br>MSPOSNOFOUND2 | D1 MCHC Indiv.<br>D1 MTH Indiv. |

| | | INTERWORK | | | | | | |
|---|---|---|---|---|---|---|---|---|
| LABEL | FUNCTION | MCC | MCHC | MTV | MVU | RSBL | SIGNAL | DATA |
| 2: | AUDIT FUNCTION IN THE VISIIED EX-CHANGE | | | | | | | |
| | START CONDITION: | | | | | | | |
| | Cancellation Message from the Home Exchange of an Automatic Visitor | | | | <=====* | | MLCMI | D1 Sending Ref,<br>D2 Sending Ind,<br>D3 Number of Digits,<br>D4 Digits 1-4,<br>D5 Digits 5-8,<br>D6 Digits 9-12 |
| | Acknowledgement. Indicate in the Most Significant Bit of the MSNB that Cancel-lation was Received (the Bit is Spare). | | | | *=====> | | MLCAO | D1 Receiv. Ind. |
| | Order Disconnection for the Visitor | | | | <=====* | | DISCVMS | D1 Visitor Ptr,<br>D2 Sending Ref. |

-continued

| | | | |
|---|---|---|---|
| | | | D3 Sending Ind,<br>D4 Number of Digits,<br>D5 Digits 1-4,<br>D6 Digits 5-8,<br>D7 Digits 9-12 & Audit Code |
| If < Mobile Station has not Registered in this Exchange During the Previous 2 Seconds ><br>Then<br>  Disconnect the Visitor.<br>  Acknowledge the Disconnection End. | *=====> | DISCVMSR | D1 Receiv. Ind,<br>D2 Result Code. |
| ENDIF.<br>Pretend the Disconnection was made, in order to release the MVU Individual. Mark in the Visitor Record that the Location Updating Message Should be sent at the Next Acess. Mark Subscriber Inactive (to Prevent Paging During Audit). | *=====> | DISCVMSR | D1 Receiv. Ind,<br>D2 Result Code. |
| Audit the Mobile Station. | <=====* | FINDMSPOS | D1 MTV Pointer,<br>D2 MTV Ref,<br>D3 Number of Digits,<br>D4 Digits 0-3,<br>D5 Digits 4-7,<br>D6 Digits 8-11<br>D7 SRNB Indic,<br>D8 SRNB LSB,<br>D9 SRNB MSB,<br>D10 Audit Code. |
| If < Congestion in MCHC ><br>Then<br>  Inform the Subscriber Block. | *=====> | MSPOSNOFOUND2 | D1 MTV Indiv. |
| If < State is Inactive ><br>Then<br>  Disconnect the Visitor.<br>ENDIF.<br>  END.<br>ENDIF.<br>Wait for 6 seconds (to let the Mobile Station Rescan and Become Stable on a Control Channel). | | | |
| Transfer the Audit Order. | <=====* | PAGEMS | D1 MCHC Indiv,<br>D2 MCHC Ref,<br>D3 Number of Digits,<br>D4 Digits 0-3,<br>D5 Digits 4-7,<br>D6 Digits 8-11<br>D7 SRNB INDIC,<br>D8 SRNB LSB,<br>D9 SRNB MSB,<br>D10 Audit Code. |
| Case < Response ><br>< Successful Audit ><br>Inform the Subscriber Block<br>Release the MCHC Individual.<br>If < State is Inactive > | *=====><br>*=====> | MSPAGERESP<br>MSPOSFOUND2 | D1 MCHC Indiv.<br>D1 MTV Indiv. |

-continued

| | | | | |
|---|---|---|---|---|
| Then | | | | |
| Set State to Registered. | | | | |
| Start Time Supervision. | | | | |
| Order Sending of the Location Updating Message. | *=====> | UPDATEVLOC | D1 | Sending Ref, |
| | | | D2 | Sending Ind, |
| | | | D3 | SC Indiv, |
| | | | D4 | Number of Digits |
| | | | D5 | Digits 0-3, |
| | | | D6 | Digits 4-7, |
| | | | D7 | Digits 8-11 |
| | | | D8 | SRNB INDIC, |
| | | | D9 | SRNB LSB, |
| | | | D10 | SRNB MSB |
| Send the Location Updating Message. | *=====> | MLUMO | D1 | Exchange Ptr |
| | | | D2 | Sending Ref, |
| | | | D3 | Sending Ind, |
| | | | D4 | Number of Digits, |
| | | | D5 | Digits 1-4, |
| | | | D6 | Digits 5-8, |
| | | | D7 | Digits 9-12 |
| | | | D8 | SRNB INDIC, |
| | | | D9 | SRNB LSB, |
| | | | D10 | SRNB MSB, |
| ENDIF. | | | | |
| END. | | | | |
| < No Audit Response > | *=====> | NOPAGERESP | D1 | MCHC Indiv. |
| Inform the Subscriber Block | *=====> | MSPOSNOFOUND2 | D1 | MTV Indiv. |
| Release the MCHC Individual. | | | | |
| If < State is Inactive > | | | | |
| Then | | | | |
| Disconnect the Visitor. | | | | |
| ENDIF. | | | | |
| END. | | | | |
| < Congestion in Paging > | *=====> | PAGECONG | D1 | MCHC Indiv. |
| Inform the Subscriber Block. | *=====> | MSPOSNOFOUND2 | D1 | MTV Indiv. |
| Release the MCHC Individual. | | | | |
| If < State is Inactive > | | | | |
| Then | | | | |
| Disconnect the Visitor. | | | | |
| ENDIF. | | | | |
| END. | | | | |
| ENDCASE. | | | | |

Although the table set forth above presents in detail the structure and operation of one embodiment of the present invention, it could be understood that the underlying concept of the present invention may be employed via a multitude of structures and operations not shown in that table. In essence, all systems using the logic illustrated in FIG. 4 should be deemed to come within the scope of the present invention. Referring to FIG. 4, it may be seen that an accessed exchange according to the present invention need include only means to determine whether a registration is followed by a cancellation order (MTXV) or by a location updating order (MTXH) within a predetermined period of time, means for auditing if appropriate, and means for registering with the home exchange if appropriate.

It should be appreciated by those skilled in the art that the use of the present invention will help localize mobile subscribers within mobile telephone systems. This will help eliminate erroneous data within systems and, thus, enhance system operations.

Although the present invention has been described with special reference to mobile telephone systems, other types of mobile communications, such as voice and data (Mobitex TM) may be improved by including means for using an audit message to verify the location of a subscriber.

Obviously, numerous modifications and variations are possible in view of the above teachings. Accordingly, within the scope of the appended claims the present invention may be practiced otherwise than as specifically described herein.

What is claimed is:

1. A mobile communications system comprising:
   at least one subscriber;
   a home exchange for said at least one subscriber, said home exchange maintaining location data for said at least one subscriber;
   at least two exchanges, one of which may be said home exchange, within which said at least one subscriber may be located; and means for ensuring said at least one subscriber is registered as being located in only one of said at least two exchanges, wherein said means for ensuring said at least one subscriber is registered as being in only one of said at least two exchanges comprises:
means included with said at least one subscriber for registering as being located within either one of said at least two exchanges;
means included with said home exchange for determining whether said at least one subscriber is simultaneously registered as being located in more than one exchange, the occurrence of which is an erroneous indication of registration status; and
means for correcting the erroneous indication of registration status within said home exchange.

2. A system as recited in claim 1, wherein said means for correcting the erroneous indication of registration status within said home exchange comprises:
means for cancelling all but the last registration when said at least one subscriber is registered as being located in more than one exchange; and
means, triggered by a registration cancellation, for registration to be re-established by either one of said at least two exchanges in which said at least one subscriber is actually located.

3. A system as recited in claim 2, wherein said means triggered by a registration cancellation for registration to be re-established by an exchange in which said at least one subscriber is actually located comprises an audit message sent by each of said exchanges to a mobile whose registration was cancelled within a predetermined period after registration was established, and wherein a registration is re-established if and only if a response to said audit message is received by one of said exchanges.

4. A system as recited in claim 3 wherein said predetermined period is brief.

5. A system as recited in claim 4 wherein said predetermined period is on the order of 5 seconds.

6. A system as recited in claim 4, wherein said audit message is a page request.

7. A method of ensuring a mobile subscriber having a home exchange is registered as being located in only one exchange, said home exchange receiving location reports from exchanges in which said mobile subscriber may roam, comprising the steps of:
cancelling all but the last registration when more than one registration has been made because more than one exchange simultaneously reports said mobile subscriber to be located therein, said last registration becoming a retained registration; and
performing an auditing function in each exchange in which a registration was cancelled, wherein said auditing function creates a new registration that supercedes the retained, last registration if said mobile subscriber is actually located in an exchange in which a registration was cancelled.

8. A method as recited in claim 7, wherein said step of performing an auditing function comprises the steps of:
sending an audit message from the exchanges in which a registration was cancelled to said mobile station when said registration was cancelled within a predetermined period of time after said registration was established; and
using a response from said mobile station, or lack of such a response, to confirm the mobile station registration or to confirm cancellation of registration for said mobile station, respectively.

9. A method as recited in claim 8, wherein said audit message is a page request.

10. A radiotelephone exchange in a system of cooperating exchanges through which mobile subscribers may roam, each of said mobile subscribers having a home exchange, a mobile subscriber appropriately registered only in one exchange, said exchange corresponding to the one in which said mobile subscriber is physically located, said radiotelephone exchange comprising:
means for determining whether a time interval between registration of a mobile subscriber and cancellation of said registration by said mobile subscriber's home exchange is less than a predetermined amount; and
means for auditing said mobile subscriber if said time interval between registration of said mobile subscriber and cancellation of said registration of said mobile subscriber by the mobile subscriber's home exchange is less than said predetermined amount so as to be able to register said mobile.

11. An exchange as recited in claim 10, wherein said predetermined amount of time is on the order of five seconds.

12. An exchange as recited in claim 10, wherein said mobile subscriber has a mobile station, and wherein said means for auditing comprises means for sending a page request to said mobile station of said mobile subscriber.

13. A radiotelephone exchange having home subscribers in a system of cooperating exchanges which may be accessed by one or more of said home subscribers, said radiotelephone exchange comprising:
means for determining whether a home subscriber of said home subscribers is registered in more than one of said cooperating exchanges; and
means for cancelling all but the last of such multiple registrations in said cooperating exchanges upon determining such multiple registrations exist.

* * * * *